Oct. 8, 1929. W. A. GILCHRIST 1,730,884
FUEL STORAGE AND RECLAIMING SYSTEM
Filed April 13, 1922 3 Sheets-Sheet 2
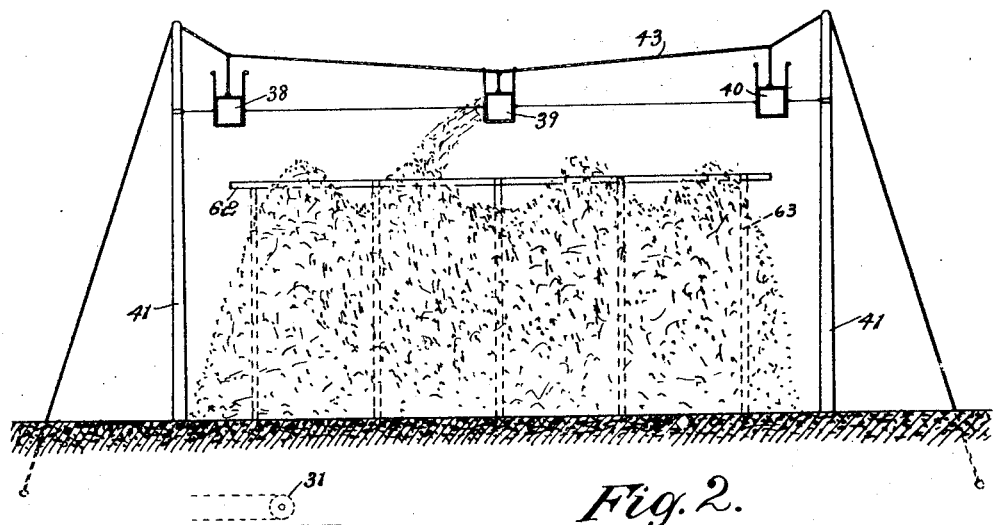
Fig. 2.
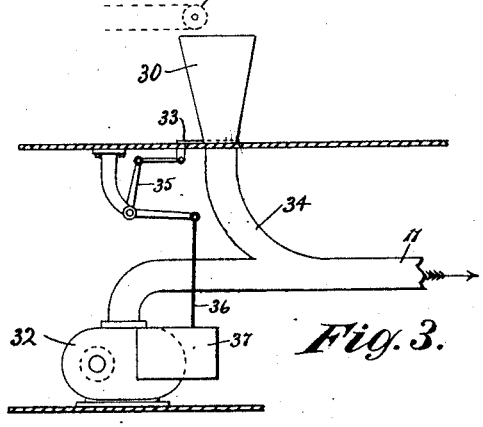
Fig. 3.
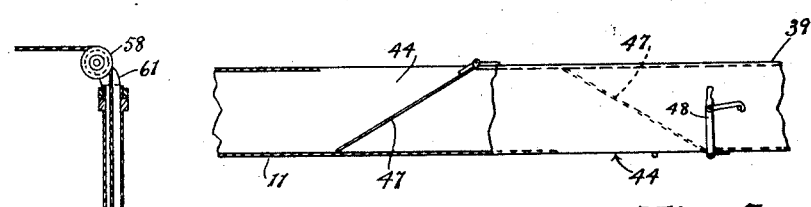
Fig. 5.
Fig. 4.
Inventor:
William A. Gilchrist
By Gillson & Gillson
Attys Patented Oct. 8, 1929

1,730,884

UNITED STATES PATENT OFFICE.

WILLIAM A. GILCHRIST, OF NEW YORK, N. Y.

FUEL STORAGE AND RECLAIMING SYSTEM

Application filed April 13, 1922. Serial No. 552,402.

The invention relates to the storage and reclaiming of fuel, having special reference to the handling of this material at manufacturing plants where a combustible waste product is employed as fuel for the generation of power. In such plants, it frequently occurs that the production of the combustible waste product represents only a small portion of the total consumption of power throughout the plant and is intermittent. Under these circumstances, the interrupting of fuel production does not, of course, materially reduce the requirements of the plant for power. For example, in the manufacture of sugar and lumber, the bagasse and wood offal are produced by crushers, or by saws and trimmers, not reasonably capable of continuous operation, while the evaporators and kilns require a continuous supply of steam in considerable quantities.

It is, furthermore, a common characteristic of waste product fuel materials that they are of low heating value. While this is due in a measure to the nature of the material itself, it is also common for waste product materials, like bagasse and wood offal, to contain large amounts of moisture, sometimes equal to fifty per cent of the total weight of the fuel. Such an enormous bulk of the material is accordingly necessary to satisfy the requirements of large steam boiler furnaces, even for short periods, that the storage of the material in bunkers or the like, located immediately adjacent the furnaces, is wholly out of the question. It follows that while steam boiler furnaces, now available, are capable of burning combustible waste products with such efficiency that the production of these materials in some industries is sufficient to furnish all of the power employed in the plant and all the requirements of the entire community for light and power as well, resort must nevertheless be had to the more concentrated and easily handled fuels, such as oil or coal, during temporary interruptions in the production of the combustible waste product.

The object of the invention is to provide an improved method and apparatus for the storage and reclaiming of fuel materials with a view to obtaining a continuous delivery of the same when the supply or production thereof is variable or intermittent.

In the accompanying drawings—

Fig. 2 is a transverse sectional view taken on the line 2—2 of Fig. 1;

Fig. 3 is a side elevation of a part of the apparatus shown in Fig. 1, the location of this part of the apparatus being indicated by the arrow 3 on Fig. 1, some features being in section in Fig. 3 and a pressure blower being conventionally represented;

Fig. 4 is a side elevation of one of the front posts shown in Fig. 1;

Fig. 5 is a detail plan sectional view of one of the branches of the blast pipe shown on Fig. 1.

In the particular arrangement of apparatus selected for illustration, an elevated branching blast pipe 11, serves for the discharge of the material upon the rectangular storage area 10, and a drag scraper 12, operating under the said blast pipe 11, is employed for reclaiming the material, as required. Some features of the invention are not limited, however, to the employment of these specific instrumentalities for the discharge and recovery of the material. When the said drag scraper is used, a collecting conveyor, conventionally represented at 13, preferably extends across one end of the storage area 10. This conveyor is desirably open at the top throughout its length, and the drag scraper 12 may deliver into it at any point.

Figure 6:
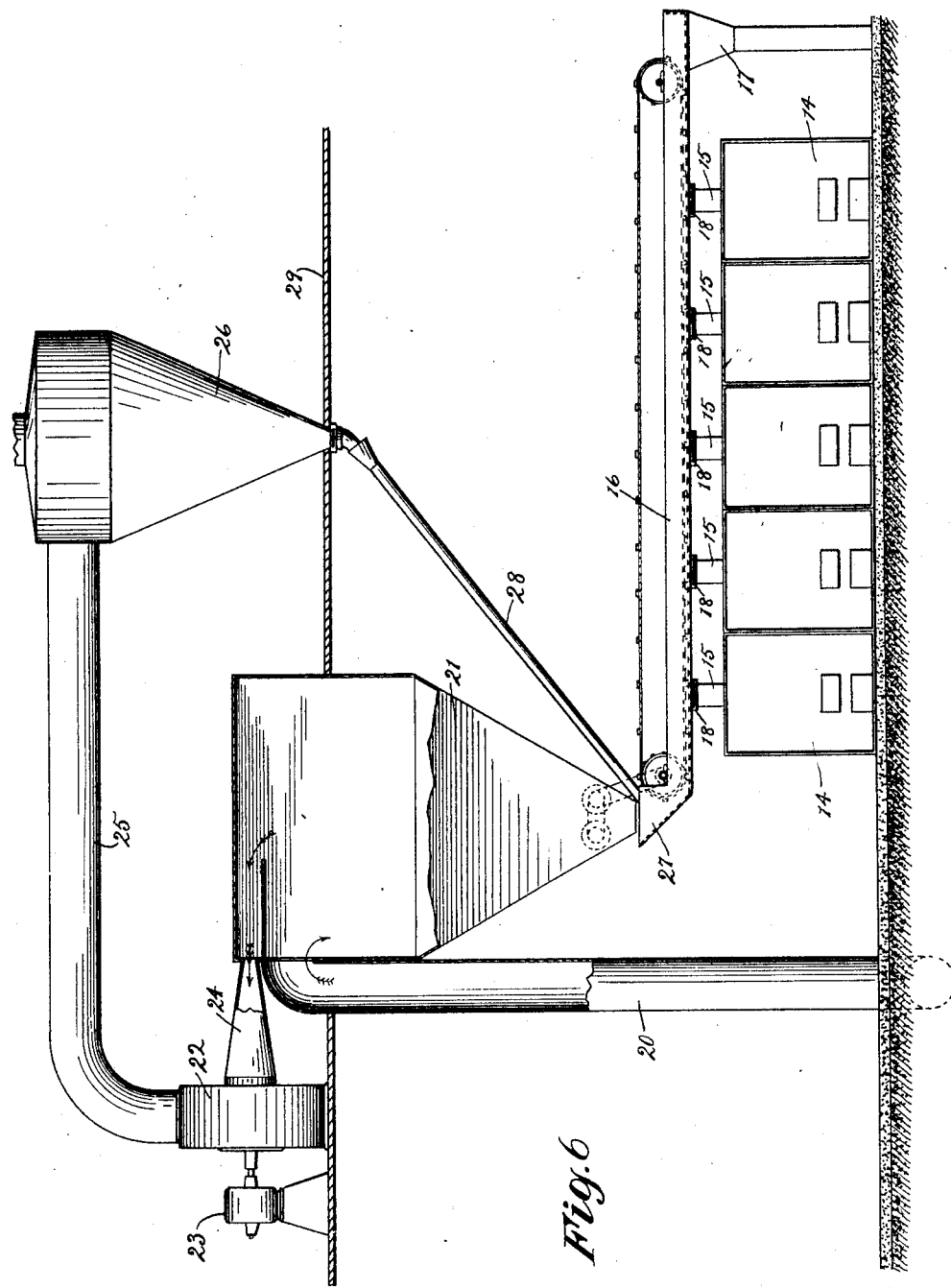
Fig. 6 is a front elevation, partly in section, conventionally showing the furnaces and some features of the apparatus not illustrated in Fig. 1.

The steam boiler furnaces of the plant are shown in front elevation at 14 (Fig. 6). As is customary in steam boiler furnaces designed for the use of bagasse or wood offal as fuel, each furnace 14 is equipped with an upright feed chute 15, located centrally over the fire box of the furnace. The several feed chutes 15 are accordingly located in a row and they are served, as usual, by a common drag conveyor 16. Since the conveyor 16 extends over the tops of all of the chutes and opens downwardly into each of them, each chute receives from the conveyor, at all times, only so much material as is necessary to fill the same, the remainder being carried on to the succeeding chutes and the surplus, if any, being discharged at the remote end of the conveyor, as into a hopper 17, all in a well known manner. Furthermore, the delivery of material into any one of the chutes may, if desired, be controlled by a damper, as 18.

As heretofore employed, the conveyor 16 has been supplied with the waste product fuel material only during periods of its production in the plant, the amount delivered to the conveyor 16, at such times, being sufficient to satisfy the immediate requirements of the furnaces and the surplus being burned elsewhere, or otherwise disposed of, its storage and reclamation for use during periods of non-production being impractical. In using the method and apparatus of the present invention, fuel material in sufficient quantity to satisfy the immediate requirements of the furnaces may also be delivered directly to the conveyor 16 by any form of apparatus (not shown) formerly used for that purpose. The invention, on the other hand, is concerned with the storage of the material not so used and its reclamation and delivery to the furnaces during periods of non-production of the said waste product.

Figure 1:
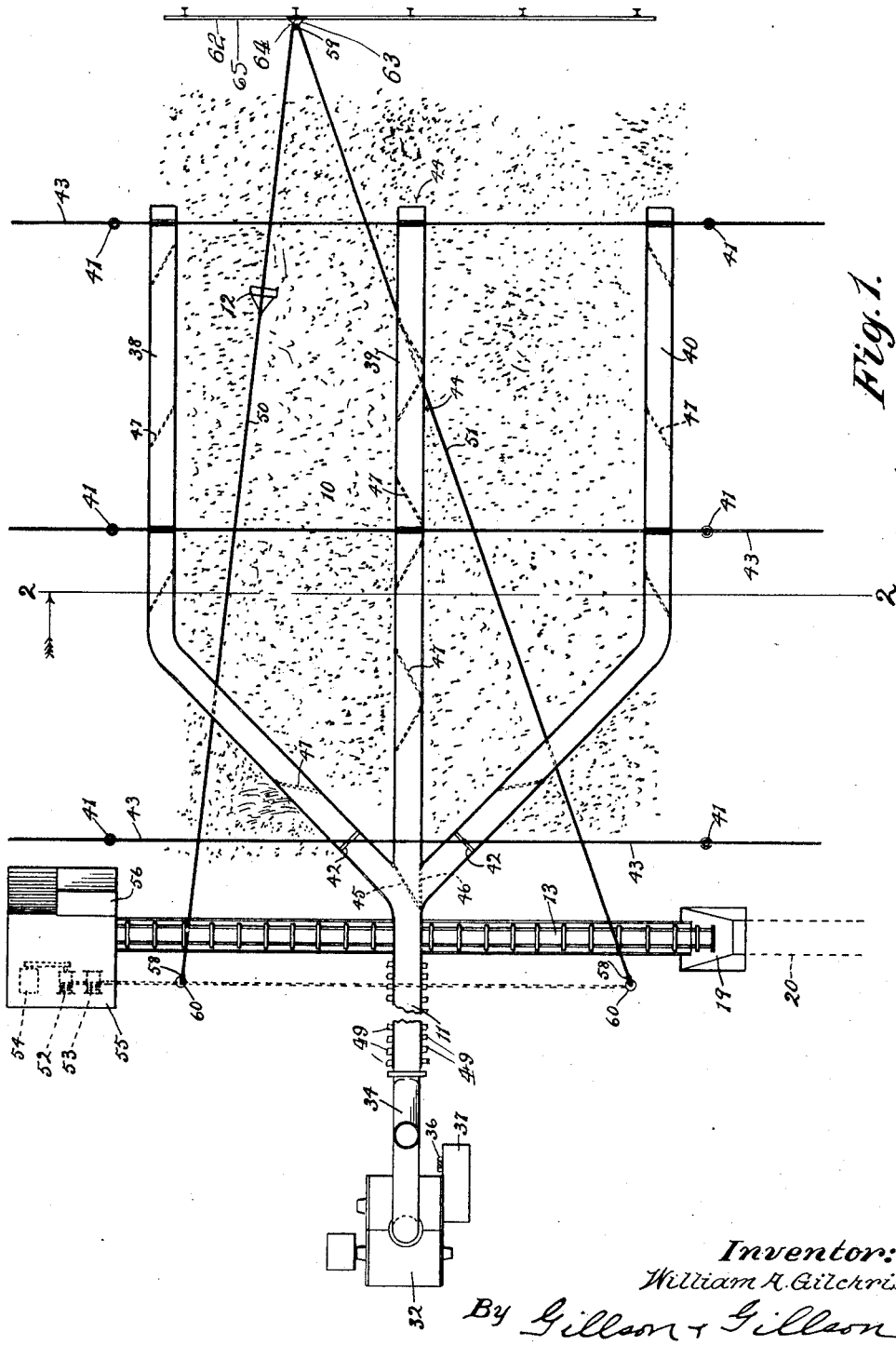
Fig. 1 is a detail plan view of apparatus provided by the invention, some parts being conventionally represented.

In carrying out the invention, the conveyor 13 (Fig. 1) may deliver directly into the conveyor 16 (Fig. 6) or these two conveyors may be different parts of the same apparatus. When the storage area 10 and furnaces 14 are widely separated, however, it is preferable to provide additional apparatus for the transfer of material between the said two conveyors. As shown, a reclaiming hopper 19 is provided adjacent the storage area 10. When the collecting conveyor 13 is employed, the reclaiming hopper 19 is positioned to receive material discharged by the said collecting conveyor.

Transfer of the material from the reclaiming hopper 19 to the conveyor 16 (Fig. 6) may be accomplished in any convenient manner, the form of apparatus, (if any) used for this purpose being selected in accordance with the character of the material to be moved and the distance over which the transfer is to be made. The drawings illustrate a section pipe 20 extending from the outlet of the hopper 19 to the upper end of a setting chamber 21, the latter being located over and delivering into the receiving hopper, as 27, of the conveyor 16. When this arrangement is used, an exhaust fan 22, preferably driven by a motor 23, is connected by a pipe 24 with the top of the settling chamber 21. Since a complete separation of the material from the air drawn into the hopper 19 and through the pipe 20 will not usually be expected in the settling chamber 21, a cyclone dust collector, as 26, may be employed in addition to the settling chamber 21. As shown, a pipe 25 leads from the outlet of the exhaust fan 22 to the dust collector 26 and the remnant of material reclaimed in the dust collector 26 is delivered by gravity to the receiving hopper 27 of the conveyor 16, as through a pipe 28. To facilitate this movement of the material, the exhaust fan 22 and dust collector 26 are most conveniently located at a higher elevation than the furnaces 14, as upon an elevated floor 29.

When a blast pipe, as 11, is employed for the discharge of material upon the storage area, as 10, a receiving hopper, as 30, is desirably provided therefor. In event this material is the surplus of a combustible waste product not required for fuel during the periods of its production, it may be brought from the plant or mill in the same manner as formerly, as by a conveyor indicated at 31, except that the conveyor 31 will be positioned to discharge into the receiving hopper 30. It will also be understood that the material delivered to the receiving hopper 30 comprises or includes the surplus of material discharged from the end of the distributing conveyor 16, as into the hopper 17.

The blast pipe 11 is served at one end by a pressure blower conventionally represented at 32 and the receiving hopper 30 is preferably arranged for an intermittent controlled delivery of material into the blast pipe adjacent the blower. As shown, a valve 33 controls the outlet of the hopper 30 and a pipe 34 is connected to the hopper outlet and enters the blast pipe 31 in a forwardly inclined direction. Under these circumstances, the action of blast created in the pipe 11 by the operation of the blower 32 is to draw a quantity of material from the hopper 30, whenever the valve 33 is open, and to advance this material through the pipe in a compact mass. For this purpose the valve 33 may be automatically opened at intervals, as by a lever 35 and crank arm 36, the latter being actuated in any convenient manner, as from the blower shaft through speed reducing gears 37.

The several branches, as 38, 39 and 40, of the blast pipe 11 are preferably supported over the storage area 10 to permit uniform distribution of material upon the same to a considerable depth and in such manner that the operation of the drag scraper 12 in reclaiming the material is not interfered with by the pipe supports. For this purpose, all of the said branches of the blast pipe 11 extend mainly in the direction of the length of the storage area and they are suspended from poles, as 41, located at intervals along the opposite sides of the same. As shown, each branch, as 38, 39 and 40 of the blast pipe hangs in stirrups, as 42, and these stirrups are in turn suspended from cables, as 43, which extend transversely over the storage area from the tops of the poles 41.

Distribution of the material over the storage area 10 is accomplished by selective delivery of the material through different branches, as 38, 39 and 40, of the blast pipe 11 and by providing each branch of the pipe with a series of lateral discharge openings 44, the several discharge openings of each branch being employed in succession. When three branches, as 38, 39 and 40, are provided, as shown, the openings 44 upon the outer branches 38 and 40 face inwardly, while the discharge openings of the intermediate branch 39 are arranged alternately upon opposite sides of the pipe.

Dampers 45 and 46, located at the union of the several branches of the blast pipe 11 (Fig. 1) serve for controlling delivery of the material through the different branches. As shown, each damper 45, 46, normally closes the opening to one of the outer branches, as 38, 39 or 40, of the blast pipe and is hingedly supported at its remote edge to swing inwardly to an oblique position across the intermediate branch, as 39. It follows that when both dampers 45, 46, are closed, delivery of material to the intermediate branch 39 is unimpeded whereas, when either of these dampers is opened, delivery of material to the intermediate branch 39 is prevented and the material is deflected by the opened damper into the corresponding outer branch 38 or 40.

Similarly the lateral discharge openings 44 of the several branches of the blast pipe 11 are controlled by dampers 47 (Fig. 5) each of which is pivotally supported at its remote edge to swing inwardly to an oblique position across the pipe. When all of the dampers 47 of any branch of the blast pipe are opened material delivered to that branch will be deflected by the nearest damper for discharge through the corresponding opening 44. Closing each damper 47, in succession from the inner end of the pipe will permit material to travel to the next discharge opening through which it will be deflected by the corresponding damper.

Any convenient device may be employed for swinging the dampers 45, 46 and 47 to control the delivery of material to different parts of the storage area. For simplicity of illustration these dampers are shown as being provided with separate upstanding crank arms 48. Since the blast pipe 11 and its several branches will usually be of sufficient size to permit an attendant to walk upon the same, these crank arms may thus be used for operating the dampers by hand, as desired. As the portion of the blast pipe 11 extending in front of the storage area 10 will preferably be sharply inclined to permit of a location of the receiving hopper 30 and pressure blower 32 at a more convenient level, this part of the pipe may be furnished with steps, or rungs, as 49, to enable the attendant to ascend the same.

The particular apparatus illustrated for operating the drag scraper 12 is well known. It includes the usual inhaul and out-haul cables 50 and 51, the same preferably comprising portions of one continuous cable upon which the scraper is hung and the said two portions of the cable extending in opposite directions from the scraper to the two winding drums, as 52 and 53 of a hoisting engine indicated at 54. Under these circumstances the hoisting engine 54 is desirably located in a power house 55 preferably occupying a position near the forward edge of the storage area at the opposite end of the collecting conveyor 13 from the reclaiming hopper 19 and having a tower 56 from which an attendant may control the operation of the hoisting engine 54 while overlooking the operation of the scraper 12 upon the heaped up material on the storage area 10.

To permit movement of the drag scraper 12 for reclaiming material from any part of the storage area 10 and delivering it to the collecting conveyor 13, guide sheaves 57, 58, (Fig. 4) are provided for each of the in-haul and out-haul cables 50 and 51 and an additional guide sheave 59, located at the remote end of the storage area, is provided for the out-haul cable 51. As shown, the guide sheaves 57 and 58 of each pair are located at the foot and top respectively of an upright tubular post 60, through which the corresponding cable extends. These posts 60 are located beyond the conveyor 13 from the adjacent margin of the storage area 10 and they are preferably separated from each other a distance nearly equal to the full length of the conveyor. The guide sheave 57 at the foot of each post 60 accordingly serves to turn the corresponding cable in its movement to or from the hoisting engine 54 into or out of the post. The guide sheaves 58, at the tops of the posts, on the other hand, serve to turn the cables for movement into or out of the posts over the storage area. Since the direction of movement of both cables 50 and 51 over the storage area to or from the corresponding post 60 will vary, each guide sheave 58 is preferably mounted in a bracket 61 having swiveled engagement with the top of the corresponding post 60.

While the arrangement contemplates a mounting of the drag scraper 12 upon the line extending to the more remote guide sheave 58, as well as upon the line extending to the nearer guide sheave 58, as shown, a further range of movement of the scraper is permitted if provision is made for supporting the guide sheave 59 in any one of a plurality of different positions across the remote margin of the storage area. For this purpose a rail 62 extends horizontally along the said remote margin of the storage area and the guide sheave 59 is attached to a carriage 63 running on said rail. When this arrangement is employed any convenient device may be provided for holding the carriage 63 against movement in different positions of adjustment along the rail 62. The arrangement shown comprises a pin 64 mounted in the carriage and adapted to enter any one of a plurality of openings 65 provided in the rail 62 throughout its length.

I claim as my invention:

1. The combination with a rectangular storage area of elevated distributing means extending above the area for discharging material thereon, and reclaiming means including a scraper movable beneath said distributing means for reclaiming said material selectively from any portion of said area and having supporting and operating means entirely independent of said distributing means, said operating means comprising a drag line connected to said scraper, and pulleys for guiding said line, and means for positioning one of said pulleys with reference to said area so that said scraper can be guided by the drag line to reclaim material from any portion of said area.

2. In a fuel handling system, a storage area, a distributing apparatus comprising a fixed structure for blasting fuel onto said area and including a plurality of delivery pipes suspended over said area carried by supports outside of said area, said pipes having regulatable means for the selective distributing of fuel onto any selected part of said area, and means including scooping means and cables connected thereto controllable from one point and movable beneath said pipes and over the fuel for removing fuel from any other part of said area simultaneously without interfering with and independent of the distributing system.

3. A system for handling fuel which is produced at variable rates and consumed at different variable rates comprising a storage area, a fixed distributing structure suspended thereover and including a plurality of pipes for blowing the fuel onto said area, manually controllable means operating under and independent of said structure above the fuel for selectively removing fuel from the same place where it is simultaneously being blown as well as different places without interfering with the blowing operations, means disposed along the entire length of one margin of the area for receiving at any point thereof the removed fuel and for conveying it to a furnace for consumption, and means for automatically returning to said structure whatever fuel has been removed in excess of the consumption requirements of the furnace.

4. The combination with a storage area of a collecting conveyor extending across one end of the storage area, an elevated blast pipe supported from above and extending over the storage area to deliver material onto the same and means movable over the storage area under the blast pipe for delivery to the said collecting conveyor, said means comprising a drag scraper, a pair of fixed sheaves adjacent said end of said storage area, and a transversely movable sheave at the opposite end of said area, a winding drum, and a cable passing through said sheaves to said winding drum, said scraper being attachable to either run of said cable.

5. The combination with a storage area of an elevated blast pipe supported from above and extending centrally over the storage area and having oppositely directed lateral discharge openings arranged throughout its length, a drag scraper movable over the storage area under the blast pipe, an in-haul line extending from the drag scraper to one end of the storage area, a guide sheave supported for transverse adjustment across the other end of the storage area, and an out-haul line extending from the drag scraper to the said guide sheave and thence to the first mentioned end of the storage area, at a point removed from said in-haul line a distance substantially equal to the width of said storage area.

6. The combination with a storage area, of a blast pipe extending over the storage area and delivering onto the same, means outside of said storage area for supporting said blast pipe from above, thus providing an unobstructed space over said area, a drag scraper movable over the storage area under the blast pipe, an in-haul line extending from the drag scraper to one end of the storage area, a collecting conveyor extending across the said end of the storage area, a guide sheave supported for transverse adjustment across the other end of the storage area, an out-haul line extending from the drag scraper to the said guide sheave and thence to the first mentioned end of the storage area and a pair of guide sheaves located adjacent the opposite ends of the collecting conveyor for selective engagement with the in-haul and out-haul lines respectively.

7. The combination with a storage area of a reclaiming conveyor located adjacent to and extending the entire length of one margin of the storage area, an elevated blast pipe extending over the storage area and delivering onto the same and a drag scraper movable over the storage area under the blast pipe for delivery to any part of the reclaiming conveyor.

8. The combination with a storage area, of means elevated above said area for distributing material onto all parts of said area, and collecting means adapted for collecting and returning stored material from all parts of said area having cables and scooping means movable underneath the distributing means entirely independent therefrom.

9. The combination with a storage area, of a reclaiming conveyor located adjacent to and extending substantially the entire length of one margin of the storage area, distributing means elevated above said area for distributing material onto all parts of said area, and a drag scraper and means for operating the same adapted for moving the scraper over any part of the storage area beneath the distributing means and entirely independent therefrom for delivering stored material from any part of the storage area to any part of the reclaiming conveyor.

10. The combination with a storage area, of distributing means adapted to convey material to and discharge it upon any part of the storage area, a reclaiming conveyor extending along substantially the entire length of one margin of the storage area and reclaiming means including means for scooping stored material from the storage area and flexible cables for moving the scooping means, said reclaiming means being adapted to move said scooping means to and from any part of the storage area beneath and entirely independent of said distributing means and to discharge the scooped material onto said conveyor.

11. The combination with a storage area, of distributing means adapted to convey material to and discharge it upon any part of the storage area, a reclaiming conveyor extending along substantially the entire length of one margin of the storage area and reclaiming means including means for scooping stored material from the storage area and flexible cables for moving the scooping means, said reclaiming means being adapted to move said scooping means to and from any part of the storage area beneath and entirely independent of said distributing means and to discharge the scooped material onto said conveyor at any point thereof along said margin.

12. The combination with a rectangular storage area of elevated distributing means including conduits extending above said area and means for conveying material through said conduits to and discharging it selectively on any part of the storage area, and reclaiming means including scooping means and flexible cables and means for controlling and operating the same adapted for moving the scooping means to and from any part of the rectangular storage area beneath and entirely independent of the distributing means for reclaiming stored material from all parts of the storage area.

WILLIAM A. GILCHRIST.